United States Patent
Yoshida

(10) Patent No.: US 7,418,196 B2
(45) Date of Patent: Aug. 26, 2008

(54) VIDEO SIGNAL RECORDING APPARATUS

(75) Inventor: Sinji Yoshida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 834 days.

(21) Appl. No.: 10/999,964

(22) Filed: Dec. 1, 2004

(65) Prior Publication Data

US 2005/0141860 A1 Jun. 30, 2005

(30) Foreign Application Priority Data

Dec. 3, 2003 (JP) ............... P.2003-405240

(51) Int. Cl.
*H04N 7/01* (2006.01)
(52) U.S. Cl. ............... 386/131; 386/117; 386/124; 386/126
(58) Field of Classification Search ............... 386/117, 386/24–126, 131
See application file for complete search history.

(56) References Cited

U.S. PATENT DOCUMENTS

| 5,982,432 | A | * | 11/1999 | Uenoyama et al. | 375/240.01 |
| 6,125,013 | A | | 9/2000 | Choung | 360/137 |
| 6,577,812 | B1 | | 6/2003 | Kikuchi et al. | 386/105 |
| 7,343,089 | B2 | * | 3/2008 | Shibutani et al. | 386/131 |
| 2003/0099460 | A1 | | 5/2003 | Imada et al. | 386/52 |

FOREIGN PATENT DOCUMENTS

| JP | 6-76474 | 3/1994 |
| JP | 8-31044 | 2/1996 |
| JP | 10-143999 | 5/1998 |
| JP | 11-176096 | 7/1999 |

(Continued)

OTHER PUBLICATIONS

Ulead: "DVD MovieFactory 3: User Guide," Article from the Internet, 'Online! Nov. 2003, XP002321798. Retrieved from the Internet: URL:ftp://ftp.ulead.com/pub/Manual/DVDMovieFactory/3.0 dvdmf_advanced_e.zip>, pp. 54-58.

(Continued)

*Primary Examiner*—Thai Tran
*Assistant Examiner*—Mishawn Dunn
(74) *Attorney, Agent, or Firm*—Morgan, Lewis & Bockius LLP

(57) ABSTRACT

A recording time acquiring device is provided to acquire the recording time of the video signal recorded on the digital videotape on the basis of signals outputted from the digital video camera when the digital videotape is fast-forwarded from a leading position to an ending position of recording in the digital video camera. In an automated correction mode, a bit rate computing device records the video signal for recording on the optical disk on the basis of the recording time acquired by the recording time acquiring device.

5 Claims, 4 Drawing Sheets

FOREIGN PATENT DOCUMENTS

| | | |
|---|---|---|
| JP | 2002-152647 | 5/2002 |
| JP | 2002-152657 | 5/2002 |
| JP | 2002-176618 | 6/2002 |
| JP | 2002-262211 | 9/2002 |
| JP | 2003-324680 | 11/2003 |

OTHER PUBLICATIONS

Ulead: "Ulead DVD Movie Factory Tutorial: Copy VHS and DV tape to DVD with Direct to Disc" 'Online! Mar. 16, 2005, XP002321799. Retrieved from the Internet: URL:http://www.ulead.com/learning/dmf/dmf3__01__1.htm>, retrieved on Mar. 16, 2003.

Pinnacle Systems: "Studio version 8 manual, Chapter 1,2" 'Online! Oct. 9, 2002, pp. 27-40, XP002321800. Retrieved from the Internet: URL:http://www.pinnaclesys.com/DocSupport1.asp?division__id=1&langue__id=10&product__id=577&productname=&page__id=141>' retrieved on Mar. 16, 2005!, pp. 1, 33, 24.

\* cited by examiner

VIDEO SIGNAL RECORDING APPARATUS

BACKGROUND OF THE INVENTION

1. Field of the Invention

The invention relates to a DVD recorder and a video signal recording apparatus for recording an encoded signal after a digital video signal outputted from a digital video camera for reproducing a digital videotape has been extended.

2. Description of the Related Art

In a digital video cassette tape, where a tape capable of recording a video signal for 80 minutes (hereinafter referred to as a 80-minutes tape) is employed, if a long mode is adopted, the video signal for 120 minutes can be recorded. For this reason, where the video signal recorded in the long mode on the 80-minutes tape is reproduced and a DVD-standard video signal converted from the video signal thus reproduced is recorded on an optical disk, for the purpose of minimizing deterioration of the video signal, the bit rate of the video signal when it is recorded on the optical disk was set at 5 Mbps which is the bit rate corresponding to the video signal for 120 minutes (referred to as a first related art).

The following technique has been also proposed (referred to as a second related art). In this technique, the recordable remaining capacity of a disk is computed and displayed. Thus, a user knows the recordable capacity from the remaining capacity displayed, and within a range of the remaining capacity, enters the recording capacity of information to be recorded and the recording time of the information. By carrying out the operation of R1=w/t—on the recording capacity w and recording time w thus inputted, the average transfer rate R1 is computed (for example, see JP-A-6-76474 (Paragraphs 0022-0024)).

Further, the following technique has been also proposed (referred to as a third related art). In this technique, the maximum recordable capacity D of an optical disk is read and a user's desired recording time T is entered. By carrying out the operation of R2=D/T, the transfer rate R2 is computed. The video signal and audio signal are recorded at the transfer rate thus computed (see JP-A-143999 (Paragraphs 0019-0024)).

Further, the following technique has been also proposed (referred to as a fourth related art). In this technique, the recording time t which is a recording time of all the programs set with an automated picture quality of recording-preserved programs is acquired. Assuming that the recordable remaining capacity is w, by carrying out the operation R3=(w−b)/t (b denotes a preliminary capacity), the average recording rate R3 during recording is computed (see JP-A-176096 (Paragraphs 0644-0646).

SUMMARY OF THE INVENTION

However, the first related art presents the following problem. Where the video signal is recorded in the long mode on the 80-minutes tape, the recordable recording time exceeds 120 minutes. This is because the digital videotape is designed so that the video signal can be recorded for the period of time substantially longer by several minutes than 120 minutes in order to permit the video signal with standardized 120 minutes to be recorded even when a minor speed error occurs in the traveling of the digital videotape. Therefore, where the video signal is recorded to the end of the digital videotape in the long mode on the 80-minutes tape, the recording time of the video signal recorded exceeds 120 minutes.

Thus, where the video signal reproduced from the digital videotape is recorded on the optical disk at the bit rate capable of recording the 120-minutes video signal without generating any vacant area, the video signal of the portion exceeding 120 minutes cannot be recorded on the optical disk. Namely, assuming that the video signal is recorded to the end of the digital videotape in the long mode on the 80-minutes tape, where the video signal thus recorded on the digital videotape is recorded on the optical disk at the bit rate set corresponding to the long mode of the 80-minutes tape, the video signal recorded on the optical disk results in unfinished recording.

In order to prevent such an inconvenience, the user himself must set the bit rate and carry out a recording test on whether or not the recording can be realized at the set bit rate without generating "unfinished recording" and any vacant area. This is very troublesome for the user. If the vacant area becomes large or "unfinished recording" is generated even slightly, the user must carry out the recording test at a bit rate changed again. Thus, where only-once rewritable optical disk is employed, the capacity of this optical disk will be consumed unnecessarily.

In the second related art, the recording time is inputted by the user. Therefore, it is difficult to adopt this related art to solve the problem presented by the first related art, i.e., that a portion with the recording time exceeding 120-minutes of the video signal recorded on the digital videotape cannot be recorded on the optical disk.

In the third related art also, likewise, the desired recording time is entered by the user. Therefore, it is difficult to adopt this related art to solve the problem presented by the first related art, i.e., that a portion with the recording time exceeding 120-minutes of the video signal recorded on the digital videotape cannot be recorded on the optical disk.

In the fourth related art, likewise, the recording time is determined by a portion set with an automated picture quality of recording-preserved programs set by the user. Therefore, it is difficult to adopt this related art to solve the problem presented by the first related art, i.e., that a portion with the recording time exceeding 120-minutes of the video signal recorded on the digital videotape cannot be recorded on the optical disk.

This invention has been accomplished in order to solve the above problem.

It is an object of the invention to provide a video signal recording apparatus which can record the entire video signal recorded on a digital videotape without generating any vacant area on an optical disk even when the substantial recoding time of a digital videotape is longer than a prescribed recording time, prevent partial deterioration in the picture quality of the video signal recorded on the optical disk and suppress complication of the key operation during dubbing.

Another object of this invention is to provide a video signal recording apparatus which can record the entire video signal recorded on a digital videotape without generating any vacant area on an optical disk even when the substantial recoding time of a digital videotape is longer than a prescribed recording time, by acquiring the recording time on the basis of the signal when the digital videotape is fast-forwarded from a leading position to an ending position and computing the bit rate of the video signal for recording on the basis of the recording time thus acquired.

In addition to the above objects, a still another object of this invention is to provide a video signal recording apparatus which can prevent partial deterioration in the picture quality of the video signal recorded on an optical disk by keeping the bit rate of the video signal for recording at a constant value from when the recording on the optical disk is started to when it is ended.

In addition to the above objects, a further object of the invention is to provide a video signal recording apparatus which can prevent deterioration in the picture quality of most of the video signal recorded on an optical disk and minimize the time generating the deterioration even when the deterioration occurs, by decreasing the bit rate of the video signal for recording on the side of ending the recording of the video signal for recording on the optical disk.

In addition to the above objects, a further object of this invention is to provide a video signal recording apparatus which can suppress complication of a key operation for the shift to an automated correction mode without incurring an increase in the number of key switches.

In order to solve the above problem, the DVD recorder Including a signal converting device that signal-converts a reproduced video image which is a digital video signal outputted from a digital video camera for a digital videotape into a video signal for recording which is a video signal to be recorded on an optical disk; and a bit rate computing device that computes a bit rate when the video signal for recording signal-converted from the reproduced video signal is recorded on the optical disk. The DVD recorder further includes an automated dubbing key provided in a remote controller; and a recording time acquiring device for acquiring a recording time of the video signal recorded on the digital videotape on the basis of a signal outputted from the digital video camera when the digital videotape is fast-forwarded from a leading position to an ending position of recording in the digital video camera. In this DVD recorder, when an automated dubbing key is depressed, the recording time acquiring device is caused to acquire the recording time of the video signal recorded on the digital videotape; on the basis of the recording time acquired by the recording time acquiring device, the bit rate computing device is caused to compute the bit rate when the video signal for recording is recorded on the optical disk, the bit rate being a constant value which is valid from when the recording of the recording video signal on the optical disk is started to when it is ended; and the signal converting device is caused to carry out the signal conversion according to the bit rate computed by the bit rate computing device, whereby the recording video signal is recorded on the optical disk.

Namely, where the bit rate is computed on the basis of the recording time acquired by the recording time acquiring device, the bit rate can be acquired which is optimum when the entire video signal recorded on the digital videotape is recorded closely on the optical disk without generating unfinished recording and any vacant area. In addition, the picture quality of the video signal recorded on the optical disk can be kept definite from when the recording on the optical disk is started to when it is ended. Further, the automated dubbing key has only be depressed once in order to start the dubbing of the video signal recorded on the digital videotape on the optical disk.

Further, the video signal recording apparatus according to this invention is applied to a DVD recorder including: a signal converting device for signal-converting a reproduced video image which is a digital video signal outputted from a digital video camera for a digital videotape into a video signal for recording which is a video signal to be recorded on an optical disk; and a bit rate computing device for a bit rate when the video signal for recording signal-converted from the reproduced video signal is recorded on the optical disk. The DVD recorder further includes: a recording time acquiring device for acquiring a recording time of the video signal recorded on the digital videotape on the basis of a signal outputted from the digital video camera when the digital videotape is fast-forwarded from a leading position to an ending position in the digital video camera. In an automated correction mode, on the basis of the recording time acquired by the recording time acquiring device, the bit rate computing device computes the bit rate when the recording video signal is recorded on the optical disk.

Namely, where the bit rate is computed on the basis of the recording time acquired by the recording time acquiring device, the bit rate can be acquired which is optimum when the entire video signal recorded on the digital videotape is recorded closely on the optical disk without generating unfinished recording and any vacant area.

In addition to the above configuration, the bit rate computed by the bit rate computing device is a constant value which is valid from when the recording of video signal for recording on the optical disk is started to when it is ended. Thus, the picture quality of the video signal recorded on the optical disk is kept definite from when the recording on the optical disk is started to when it is ended.

In addition to the above configuration, the bit rate computed by the bit rate computing device decreases on the side of ending the recording of the video signal for recording on the optical disk. Thus, the video signal recorded during a greater period which does not draw to the end of the recording is not deteriorated in its picture quality.

In addition to the above configuration, the video signal recording apparatus further includes a setting key for displaying a menu screen relative to settings of the device. On the menu screen first displayed when the setting key is depressed in an operation stopping state, the shift to the automated correction mode is made selectable. Thus, the shift to the automated correction mode can be made only by carrying out three kinds of key operations inclusive of an operation of the setting key for displaying the menu screen, a key operation for moving a cursor, and a key operation for entering a decision.

Since the bit rate is computed on the basis of the recording time acquired by the recording time acquiring device, the bit rate can be acquired which is optimum when the entire video signal recorded on the digital videotape is recorded closely on the optical disk without generating unfinished recording and any vacant area. In addition, the picture quality of the video signal recorded on the optical disk can be kept definite from when the recording on the optical disk is started to when it is ended. Further, the automated dubbing key has only to be depressed once in order to start the dubbing of the video signal recorded on the digital videotape on the optical disk. Thus, even when the substantial recording time of a digital videotape is longer than a prescribed recording time, the entire video signal recorded on the digital videotape can be recorded on the optical disk; partial deterioration in the picture quality of the video signal recorded on the optical disk can be prevented; and complication of the key operation during dubbing can be suppressed.

Since the bit rate is computed on the basis of the recording time acquired by the recording time acquiring device, the bit rate can be acquired which is optimum when the entire video signal recorded on the digital videotape is recorded closely on the optical disk without generating unfinished recording and any vacant area. Thus, even when the substantial recording time of a digital videotape is longer than a prescribed recording time, the entire video signal recorded on the digital videotape can be recorded on the optical disk without generating any vacant area.

Further, since the picture quality of the video signal recorded on the optical disk can be kept definite from when the recording on the optical disk is started to when it is ended, partial deterioration in the picture quality of the video signal recorded on the optical disk can be prevented.

Furthermore, since deterioration in the picture quality of the video signal recorded during a greater period which does not draw to the end of the recording is not generated, deterioration of the picture quality of the major part of the video signal recorded on the optical disk is prevented. Even when the deterioration occurs, the time generating the deterioration can be minimized.

Further, because the shift to the automated correction mode can be made only by carrying out three kinds of key operations inclusive of an operation of the setting key for displaying the menu screen, a key operation for moving a cursor, and a key operation for entering a decision, complication of the key operation for the shift to the automated correction mode can be suppressed.

DESCRIPTION OF THE PREFERRED EMBODIMENTS

Figure 1:
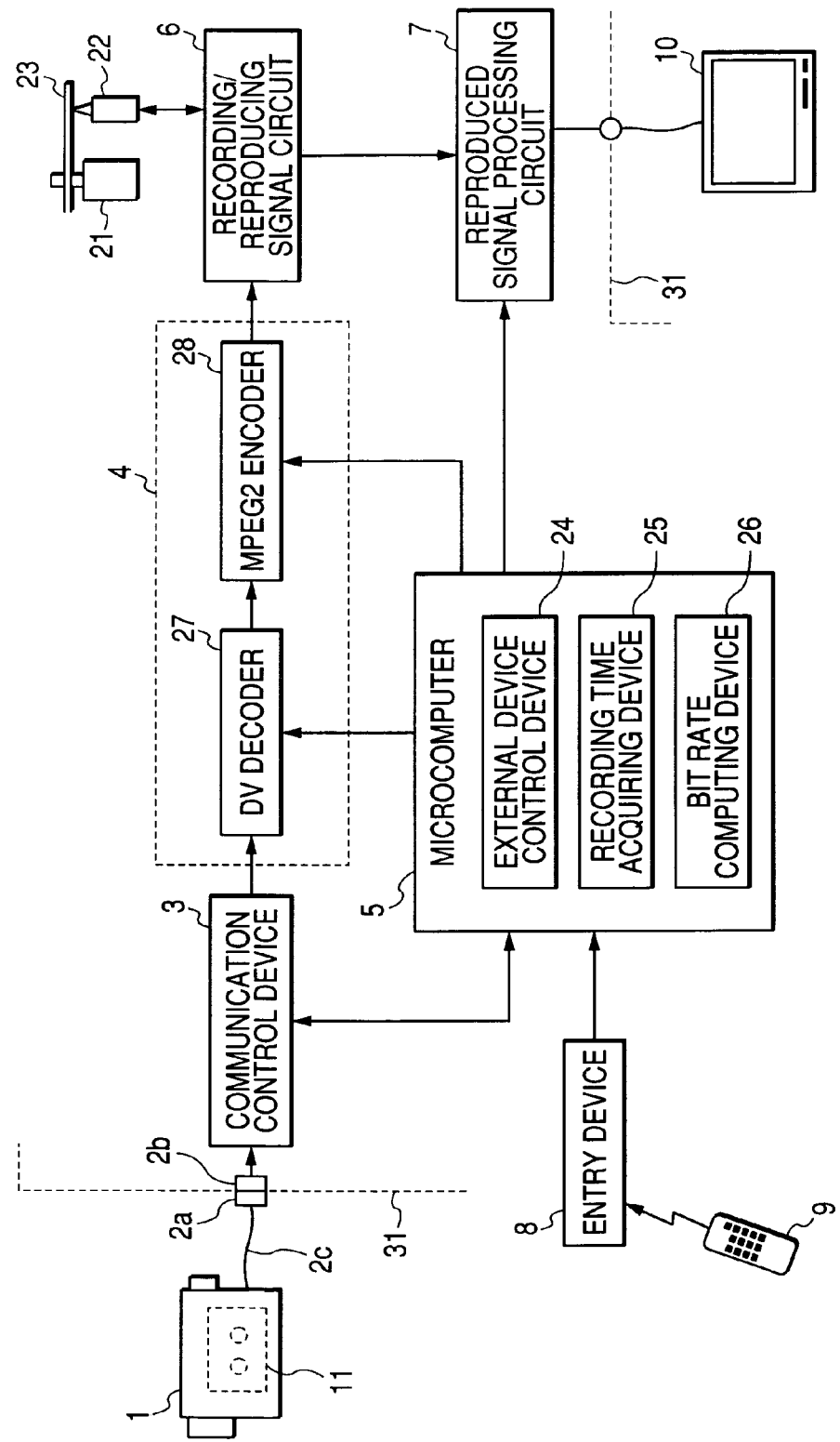
FIG. 1 is a block diagram showing the electronic configuration of a DVD recorder which is an embodiment of the invention.

Now referring to the drawings, an explanation will be given of various embodiments of this invention.

Embodiment 1

FIG. 1 is a block diagram showing the electronic configuration of a DVD recorder which is an embodiment of the video signal recording apparatus according to this invention.

In FIG. 1, a cable 2c and connectors 2a, 2b which connect a device body 31 of the DVD recorder to a digital video camera 1 are the cable and connectors standardized as IEEE 1394. The connector 2a is attached to the end of the cable 2c, and the connector 2b is attached to the device body 31 side of the DVD recorder.

A communication control device 3 exchanges information with the digital video camera 1 according to the communication method standardized as IEEE1394. The information (inclusive of information indicative of device type and information indicative of a list of acceptable commands) outputted from the digital video camera 1 during the information exchange is supplied to a microcomputer 5. Further, the information inclusive of the commands outputted from the microcomputer 5 is transferred to the digital video camera 1. The digital video information (hereinafter referred to as a reproduced video signal) outputted from the digital video camera 1 is supplied to a DV decoder 27.

The digital video camera 1 records a digital video signal indicative of a picked-up image on a digital videotape installed therein. The digital video camera 1 also reproduces the digital video signal recorded on the digital videotape 11 and sends the digital video signal thus reproduced (reproduced video signal) to the communication control device 3 through the cable 2c and connectors 2a, 2b.

The digital video camera 1 sends a list of acceptable commands to the communication control device 3; the list includes various commands indicative of the operations of the digital video camera such as a reproducing command, fast-forwarding command and rewinding command. The digital video camera 1, when it receives one of the acceptable commands from the microcomputer 5 through the communication control device 3, executes the operation designated by this command.

The DV decoder (hereinafter simply referred to as a decoder) 27 expands the reproduced video signal according to the DV standard because the reproduced video signal is a digital video signal according to the DV standard (standard relied on the SD specification in the digital VTR). The decoder supplies the digital video signal thus expanded to an MPEG encoder (hereinafter simply referred to as an encoder) 28. The encoder 28 encodes the digital video signal outputted from the decoder 27 to create a digital video signal according to an optical disk standard (which is a signal encoded according to the standard of MPEG2, hereinafter referred to as a video signal for recording). The decoder 27 supplies the video signal for recording thus created to a recording/reproducing signal circuit 6.

Namely, a block 4 consisting of the decoder 27 and the encoder 28 constitutes a signal conversion device defined in claims, which converts the reproduced video signal outputted from the digital video camera 1 into the video signal for recording which is employed when it is recorded on the optical disk 23 such as DVD-R capable of recording the digital video signal according to the optical disk standard. It should be noted that the audio signal is not illustrated.

A recording/reproducing signal circuit 6, in recording, creates a driving signal for driving a pick-up 22 on the basis of the video signal for recording outputted from the signal conversion device 4 and supplies the driving signal thus created to the pick-up 22. The recording/reproducing signal circuit 6, in reproducing, extracts an RF signal from the signal outputted from the pick-up 22 and supplies the RF signal to a reproduced signal processing device 7.

The pick-up 22, in recording, writes the video signal for recording on the optical disk 23, which is rotation-driven by a spindle motor 23, according to the driving signal supplied from the recording/reproducing signal circuit 6. The pick-up 22, in reproducing, supplies the signal read from the data recorded on the optical disk 23 to the recording/reproducing signal circuit 6. It should be noted that the signal passage for servo control is not illustrated.

The reproduced signal processing device 7, after having decoded the digital data from the RF signal supplied from the recording/reproducing circuit 6, performs error correction therefor. The reproduced signal processing device 7 expands the video stream obtained through the error correction according to the standard of MPEG2 and thereafter D/A converts the video stream expanded. The reproduced signal processing device 7 supplies the analog video signal acquired through D/A conversion to a television receiver 10. The reproduced signal processing device 7 also supplies an analog audio signal to the television receiver 10; the analog audio signal is acquired through D/A conversion after an audio stream has been expanded.

An entry device 8 is a block equipped with a plurality of switches (not shown) provided on the front panel of the device body 31 and a light-receiving unit (not shown) for receiving an infrared signal transmitted from a remote controller. The entry device 8 serves to enter an instruction from a user. When the instruction by the user is entered, the entry device 8 supplies the instruction thus entered to the microcomputer 5.

The microcomputer 5 controls the main operations of the DVD recorder. Specifically, the microcomputer 5, when the reproduced video signal outputted from the digital video camera 1 is recorded on the optical disk 23, controls the operation of the decoder 27 and the operation of the encoder 28. Further, when the video signal recorded on the optical disk 23 is reproduced, the microcomputer 5 controls the operation of the reproduced signal processing device 7. The microcomputer 5 serves as an external device control device 24, a recording time acquiring device and a bit rate computing device 26 as a part of its function.

Incidentally, in this embodiment, the mode prepared when the reproduced video signal outputted from the digital video camera 1 is recorded on the optical disk 23 includes two modes of a normal mode and an automated correction mode. The user can select one of these two modes.

The external device control device 24 acquires a list of commands which are acceptable by the digital video camera 1 from the information obtained by the communication control device 3. The external device control device 24 selects the command necessary at a pertinent time from the list of the commands acquired, and supplies the command selected to the digital video camera 1 to control the operation thereof.

Specifically, when the reproduced video signal is to be recorded on the optical disk 23 in the automated correction mode, the external device control device 24 controls the digital video camera 1 to rewind the digital videotape 11 installed to the leading position thereof, and thereafter to fast-forward it. Completion of fast-forwarding, the external control device 24 controls the digital video camera 1 to rewind the tape to the leading position again and start the reproduction.

The recording time acquiring device 25, while the digital video camera 1 fast-forwards the digital videotape 11, acquires the recording time of the video signal recorded on the digital videotape on the basis of the signals outputted from the digital video camera 1. Specifically, when the digital video camera 1 fast-forwards the digital videotape 1, if the video signal is recorded at the portion passing a head, control signals are outputted from the digital video camera 1. A time stamp indicative of the recording time is also outputted.

The recording time acquiring device 25, therefore, counts the number of control signals during the fast-forwarding. From the counted result, the recording time acquiring device 25 computes the recording time of the video signal recorded on the digital videotape 11. On the basis of the value of the time stamp outputted from the digital video camera 1 during the fast-forwarding, the recording time acquiring device 25 computes the recording time of the video signal recorded on the digital videotape 11 (one of these two methods has only to be adopted).

The bit rate computing device 26 computes the bit rate of the video signal for recording when it is recorded on the optical disk 23. Specifically, in the normal mode, where the digital videotape 11 reproduced by the digital video camera 1 is the 80-minutes tape capable of executing e.g. 80-minutes recording and the recording mode is in the long mode, the bit rate computing device 26, assuming that the recording time of the video signal recorded on the digital videotape 11 is tow hours, computes the bit rate required when the video signal corresponding to two hours is recorded on the optical disk 23 with no vacant area. Further, the bit rate computing device 26 controls the encoder 28 so that the bit rate of encoding in the encoder 27 is the bit rate thus computed.

On the other hand, in the automated correction mode, even where the digital videotape 11 reproduced by the digital video camera 1 is the 80-minutes tape capable of making the 80-minutes recording and the recording mode is in the long mode, it is assumed that the recording time of the video signal recorded on the digital videotape substantially exceeds or does not exceed two hours as the case may be. Thus, under this assumption, on the basis of the substantial recording time of the video signal recorded on the digital videotape, the bit rate computing device computes the bit rate when the video signal for recording is recorded on the optical disk.

Namely, since the recording time acquired by the recording time acquiring device 25 indicates the substantial recording time of the video signal recorded on the digital videotape 11, the bit rate computing device 26 computes the bit rate corresponding to the recording time acquired by the recording time acquiring device 25.

Thus, if the recording time is less than two hours, the bit rate corresponding to the recording time less than two hours is computed. If the recording time is exceeds two hours, the bit rate corresponding to the recording time exceeding two hours is computed. Further, after the bit rate has been computed, the bit rate computing device 26 controls the encoder 28 so that the bit rate of encoding in the encoder 27 is the bit rate thus computed.

As described above, in this embodiment, the mode when the video signal recorded on the digital videotape 11 is recorded on the optical disk 23 includes two modes of the normal mode and the automated correction mode.

Incidentally, although the device body 31 is actually provided with a tuner unit for receiving a commercial broadcasting and an A/D conversion unit for converting the analog video signal outputted from the tuner unit into a digital video signal and supplies the digital video signal to the encoder 28, these blocks are not illustrated.

Figure 2:
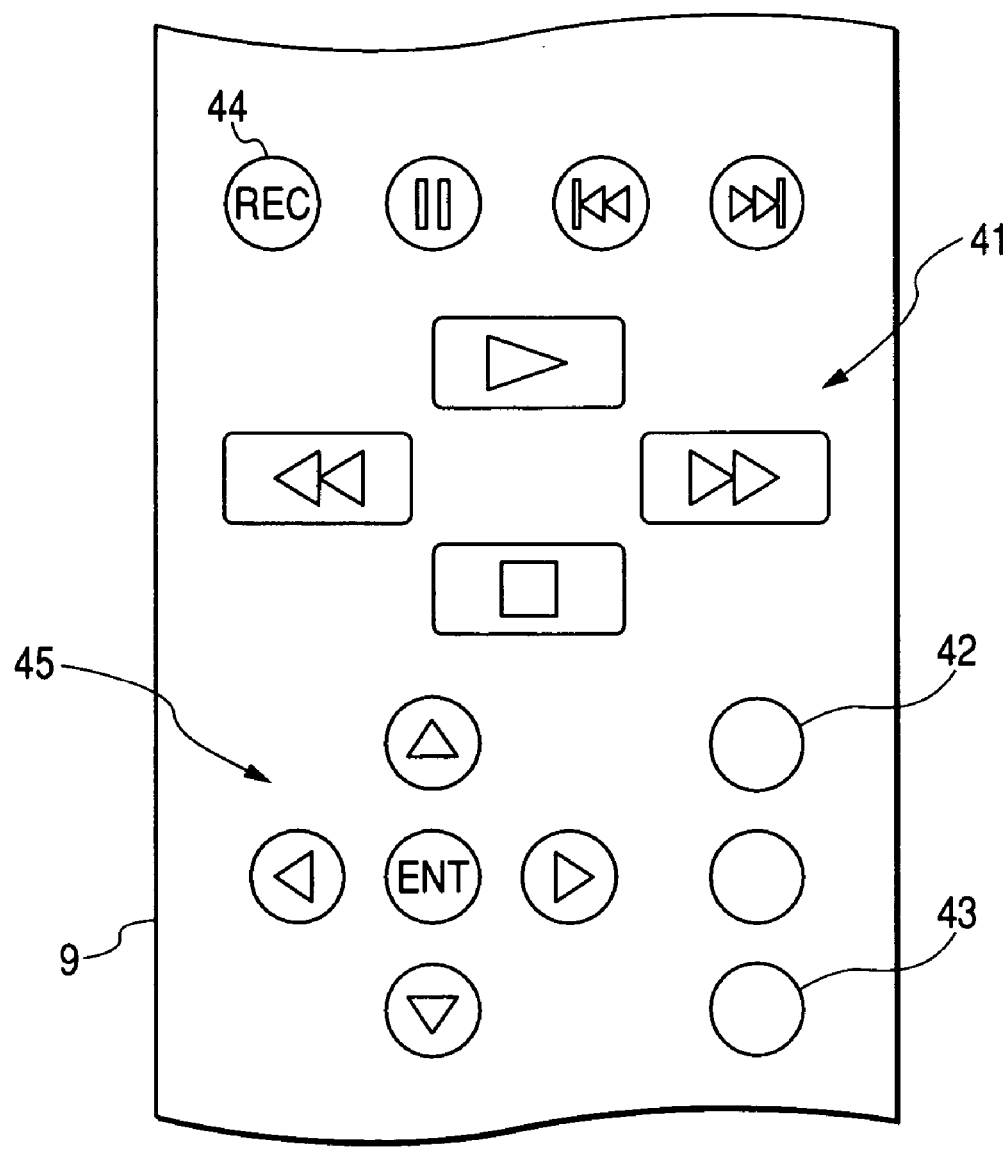
FIG. 2 is a view for explaining a part of key switches provided on a remote controller.

FIG. 2 is a view for explaining a part of key switches provided on the remote controller 9. Reference numeral 41 denotes four key switches mainly used for reproducing the optical disk 23, which are a reproducing key, fast-forwarding key, a fast-rewinding key and a stopping key. Reference numeral 42 denotes setting keys for displaying a menu screen for making various settings for the device.

Reference numeral 43 denotes a key switch (hereinafter referred to as an automatic dubbing key) for changing the recording or operating mode from the normal mode into the automated correction mode and automatically recording the video signal recorded on the digital videotape 11 on the optical disk 23. Reference numeral 44 denotes a recording key for starting the operation of recording the video signal on the optical disk 23. Reference numeral 45 denotes key switches used when selecting items by moving a cursor.

Figure 3:
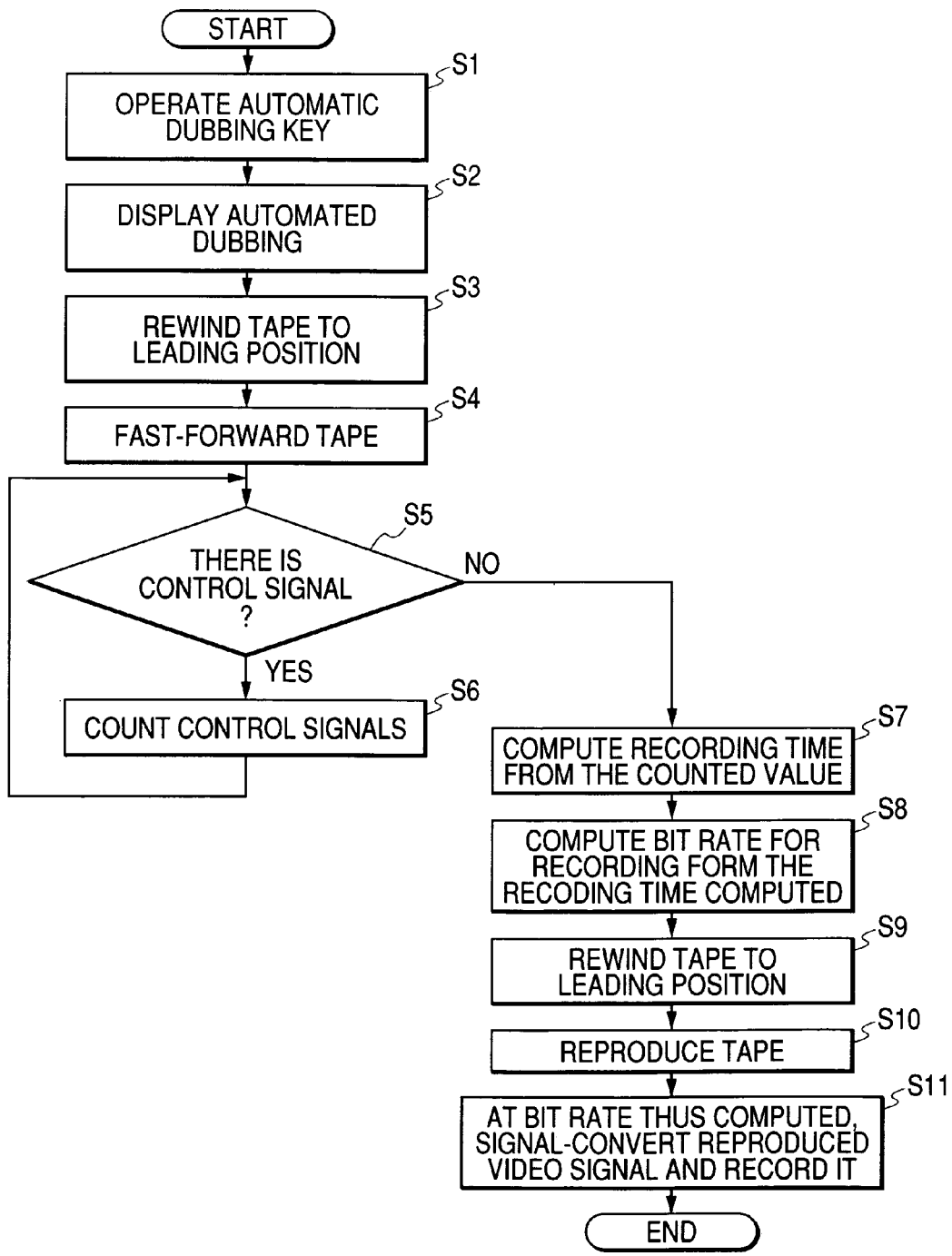
FIG. 3 is a flowchart showing the main operation in the embodiment when the video signal recorded on a digital videotape is recorded on an optical disk.

FIG. 3 is a flowchart showing the main operations in the embodiment when the reproduced video signal outputted from the digital video camera 1 is recorded on the optical disk 23. Referring to this flowchart as necessary, the operations in this embodiment will be explained.

It is assumed that the digital video camera 1 is connected to the device body 31 through the cable 2c, connector 2a and connector 2c (the external device control device 24, when informed of that the digital video camera 1 has been connected, acquires a device model name and a list of acceptable commands and internally stores them). It is also assumed that the digital videotape 11 installed in the digital video camera 1 is the 80-minutes tape and the video signal has been recorded in the recording mode of the long mode.

Thereafter, in order that the video signal recorded on the digital videotape 11 can be recorded on the optical disk 23 without generating unfinished recording, it is assumed that the automatic dubbing key 43 has been depressed by the user (step S1). When the automatic dubbing key 43 is depressed, the microcomputer 5 changes the recording mode from the normal mode into the automated correction mode. Using the on-screen-display circuit (not shown) within the reproduced signal processing device 7, the microcomputer 5 displays on the television receiver 10 that the automatic dubbing resulting in no unfinished recording has been started (step S2).

Next, referring to the list of commands acquired, the external device control device 24 issues a rewinding instruction to the digital video camera 1. According to the instruction, therefore, the digital video camera 1 rewinds the digital videotape 11 to the leading position (step S3). Thereafter, the external device control device 24 issues an instruction of fast-forwarding to the digital video camera 1 to cause the digital videotape 11 to start fast-forwarding (step S4).

When the fast-forwarding of the digital videotape 11 is started, control signals recorded as well as the video signal are outputted from the digital video camera 1. The control signals are guided to the microcomputer 5 through the communication control device 5 so that the recording time acquiring device 25 within the microcomputer 5 counts the number of the control signals (steps S5, S6).

When the outputting of the control signals is stopped, the operation shifts to step S7. In step S7, the recording time acquiring device 25 computes the recording time of the video signal recorded on the digital videotape 11 from the counted value of the control signals (since the control signals are recorded together with the video signal, the number of control signals indicates the recording time of the video signal).

Incidentally, where the video signal has been recorded on the digital videotape 11 to the end thereof in the long mode, as described above, the substantial recording time of the video signal exceeds 120 minutes. The recording time computed in step S8 is a value such as 124 minutes or 126 minutes.

The bit rate computing device 26 computes the bit rate of the video signal to be recorded on the optical disk 23 on the basis of the recording time computed by the recording time acquiring device 25 (step S8). Incidentally, the bit rate computed at this time is a value which permits the video signal corresponding to the recording time computed by the recording time acquiring device 25 to be closely recorded on the optical disk 23 without generating any vacant area. Thus, the bit rate computed at this time is a value such as about 4.8 Mbps or about 4.75 Mbps.

Therefore, the external device control device 24 issues an instruction of rewinding to the digital video camera 1 to rewind the digital videotape 11 (step S9). After the digital videotape 11 has been rewound to the leading position, the external device control device 24 issues an instruction of reproducing to the digital video camera 1 to start the reproducing of the digital videotape 11 (step S10). Thus, the reproduced video signal is outputted from the digital video camera 1.

The reproduced video signal is guided to the decoder 27 through the communication control device 3 and expanded. The video signal thus expanded is guided to the encoder 28 and encoded there at a compression ratio corresponding to the bit rate computed by the bit rate computing device 26. The encoded signal (video signal for recording) is recorded on the optical disk 23 through the recording/reproducing circuit 6 (step S11).

As understood from the description hitherto made, when the automatic dubbing key is depressed, even where the recording time of the video signal recorded on the digital videotape 11 exceeds 120 minutes (the recording time is 124 minutes, 126 minutes, etc.), the entire video signal recorded on the digital videotape 11 is automatically recorded on the optical disk 23 at the bit rate which permits the video signal to be closely stayed within a recordable data area of the optical disk 23 without generating unfinished recording and any vacant area.

Embodiment 2

The second embodiment will be explained below. The second embodiment has the same configuration as that in FIG. 1 as an electric configuration and is different from that in FIG. 1 only in the construction of the bit rate computing device 26. An explanation will be given of only the construction of the bit rate computing device 26.

In computing the bit rate when the video signal for recording which is the signal encoded by the encoder 28, the bit rate computing device 26 computes the bit rate so as to decrease when the recording draws to the end. Namely, the bit rate when the recording is started is set at a value (hereinafter referred to as a prescribed bit rate) which permits the video signal to be recorded on the optical disk 23 without generating any vacant area assuming that the recording time of the video signal is 120 minutes.

Assuming that the video signal corresponding to the recording time computed by the recording time acquiring device 25 has been recorded on the optical disk 23 at the prescribed bit rate, on the basis of the length of the video signal which becomes unrecordable because of the absence of the vacant area, the bit rate computing device 25 computes the bit rate when the recording draws to the end. Namely, it is assumed that the video signal corresponding to e.g. 90 minutes from the leading position of the video signal to be recorded is recorded at the prescribed bit rate. Thereafter, the bit rate computing device 25 computes the bit rate required for the remaining video signal to be recorded on the remaining vacant area of the optical disk 23 without generating unfinished recording.

Specifically, the bit rate computing device 26, if the recording time computed by the recording time acquiring device 25 is h (h>120) minutes, sets the bit rate for recording the video signal corresponding to 90 minutes (other value may be adopted) from the leading position at the prescribed bit rate of 5.0 Mbps. For the video signal corresponding to the remaining (h−90) minutes, since the vacant area in the optical disk 23 is 30 minutes in terms of the time when the bit rate is set at 5.0 Mbps, the bit rate computing device 25 computes the bit rate R required for the video signal corresponding to (h−90) minutes to be recorded in this 30-minutes area (R=5.0 Mbps×30/(h−90)).

When the recording is started, for the period of 90 minutes from the start of recording, the compression ratio of the encoder 28 is set at the value corresponding to the bit rate of 5.0 Mbps. For the period after 90 minutes elapses, the compression rate in the encoder 28 is set at the value corresponding to the bit rate R.

The operation of the second embodiment having the configuration described above can be illustrated in the flowchart of FIG. 3. The operation of this second embodiment is different from that of the first embodiment in only steps S8 and S11. Therefore, only the operations in steps S8 and S11 will be explained below.

Now assuming that the recording time computed by the recording time acquiring device 25 is e.g. 126 minutes, in step S8, the bit rate computing device 26 sets the bit rate at 5.0 Mbps until 90 minutes elapses from the start of recording, and set the bit rate at the value of R computed by the operation of (R=5.0 Mbps×30/36) after 90 minutes elapses.

Thus, in step S11, the encoder 28 encodes the video signal so that the bit rate is 5.0 Mbps during the period until 90 minutes elapses from the start of recording and is R during the period thereafter. Thus, the reproduced video signal corresponding to 126 minutes can be closely recorded within a recordable data area of the optical disk 23 without generating unfinished recording and any vacant area.

Embodiment 3

The third embodiment will be explained below. The third embodiment has the same configuration as that in FIG. 1 as an electric configuration and is different from that in FIG. 1 only in the arrangement of key switches on the remote controller 9 and the method of operating the key switches for the shift to the automated correction mode, thereby carrying out the recording on the optical disk 23. Therefore, an explanation will be given of only the arrangement of the key switches and the portion in the construction of the microcomputer 5 different from the first embodiment.

In the first embodiment, the key switch 43 on the remote controller 9 was employed as the automatic dubbing key. On the other hand, in the third embodiment, the automatic dubbing key is omitted so that the key switch 43 is employed as a key switch for entering the other instruction (allotted to the different key switch in the first embodiment). In the third embodiment, therefore, as compared with the first embodiment, the number of the key switches can be reduced by one.

Figure 4:
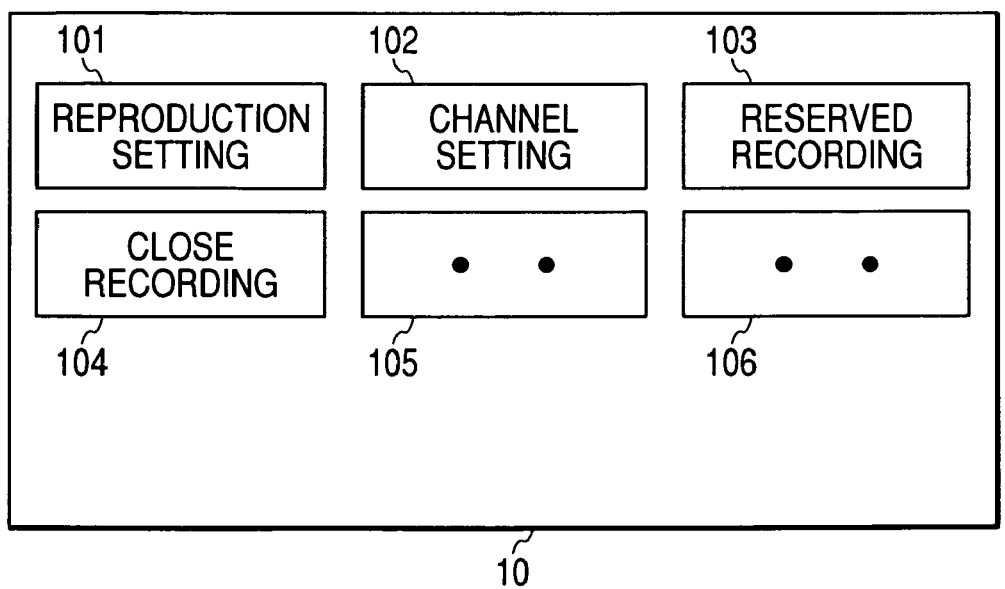
FIG. 4 is a view for explaining the menu screen displayed when a setting key is depressed in the third embodiment.

On the other hand, in a stopped state where the instruction such as reproduction from the user is awaited (which is identical to the state immediately after the power source is turned on), when the setting key 42 is depressed, the microcomputer 5 makes the control for displaying the menu screen shown in FIG. 4 on the television receiver 10.

On the menu screen are displayed an icon 101 for the shift into reproduction setting which is one of the settings of the device, an icon 102 for shift into channel setting which is one of the settings of the device, an icon 103 for the shift into the setting relative to recording such as reserved recording and icon 104 for the shift into the automated correction mode (The icon 104 is displayed only when the digital camera 1 is connected to the device body 31, and it is not displayed when the digital camera 1 is not connected because it is unnecessary. The icons 105 and 106 for the other settings are also displayed.

In the state where the menu screen shown in FIG. 4 is displayed, when the user moves the cursor to the icon 104 and depresses a decision key, the microcomputer 5 assumes that the instruction for the shift into the automated correction has been just entered. Thereafter, when the recording key has been depressed, the microcomputer 5 starts the recording operation in the automated correction mode (operation of recording the video signal recorded on the digital videotape 11 installed in the microcomputer 5 closely within a recording area of the optical disk 23 without generating unfinished recording and any vacant area, i.e. the operation from steps S3 to S11 in FIG. 3).

Incidentally, in the state where the digital video camera 1 is connected, where the menu screen shown in FIG. 4 is displayed, if the initial position of the cursor is located at the icon 104, the decision key has only to be depressed for the shift into the automated correction mode. This improves the operability of the remote controller 9.

Additionally, this invention should not be limited to the embodiments described above. For example, as regards the recording time acquiring device 25, the explanation was given of the configuration in which the recording time of the video signal recorded on the digital videotape 11 is computed on the basis of the control signals outputted from the digital video camera 1. However, the above recording time can be computed on the basis of the time stamp outputted from the digital video camera 1 when the digital videotape 11 is fast-forwarded, or otherwise computed on the basis of both the control signals and time stamp.

Further, in the second embodiment, although the bit rate was decreased by one level on the ending side of recording, it may be decreased over two levels or three levels.

What is claimed is:

1. A DVD recorder comprising:
   a signal converting device that signal-converts a reproduced video image which is a digital video signal outputted from a digital video camera for a digital videotape into a video signal for recording which is a video signal to be recorded on an optical disk;
   a bit rate computing device that computes a bit rate when the video signal for recording signal-converted from the reproduced video signal is recorded on the optical disk;
   an automated dubbing key provided in a remote controller; and
   a recording time acquiring device that acquires a recording time of the video signal recorded on the digital videotape on the basis of signal outputted from the digital video camera when the digital videotape is fast-forwarded from a leading position to an ending position of recording in the digital video camera, wherein
   when an automated dubbing key is depressed,
   the recording time acquiring device is caused to acquire the recording time of the video signal recorded on the digital videotape,
   on the basis of the recording time acquired by the recording time acquiring device, the bit rate computing device is caused to compute the bit rate when the video signal for recording is recorded on the optical disk, the bit rate being a constant value which is valid from when the recording of the recording video signal on the optical disk is started to when it is ended, and
   the signal converting device is caused to carry out the signal conversion according to the bit rate computed by the bit rate computing device, whereby the recording video signal is recorded on the optical disk.

2. A video signal recording apparatus comprising:
   a signal converting device that signal-converts a reproduced video image which is a digital video signal outputted from a digital video camera for a digital videotape into a video signal for recording which is a video signal to be recorded on an optical disk;
   a bit rate computing device that computes a bit rate when the video signal for recording signal-converted from the reproduced video signal is recorded on the optical disk;
   a recording time acquiring device that acquires a recording time of the video signal recorded on the digital videotape on the basis of signals outputted from the digital video camera when the digital videotape is fast-forwarded from a leading position to an ending position in the digital video camera, wherein
   in an automated correction mode, on the basis of the recording time acquired by the recording time acquiring device, the bit rate computing device computes the bit rate when the recording video signal is recorded on the optical disk.

3. A video signal recording apparatus according to claim 2, wherein the bit rate computed by the bit rate computing device is a constant value which is valid from when the recording of the recording video signal on the optical disk is started to when it is ended.

4. A video signal recording apparatus according to claim 2, wherein the bit rate computed by the bit rate computing device decreases on the side of ending the recording of the recording video signal on the optical disk.

5. A video signal recording apparatus according to claim 2, further comprising:
   a setting key that displays a menu screen relative to settings of the apparatus,
   wherein on the menu screen first displayed when the setting key is depressed in an operation stopping state, the shift to the automated correction mode is made selectable.

* * * * *